United States Patent [19]

Aldridge et al.

[11] Patent Number: 5,787,015

[45] Date of Patent: Jul. 28, 1998

[54] MODULAR ANALYZER SYSTEM

[75] Inventors: Roland Aldridge, Los Angeles; Mark Olsen, Long Beach, both of Calif.; Mitch Timin, State College, Pa.

[73] Assignee: Rosemount Analytical, Inc., La Habra, Calif.

[21] Appl. No.: 307,281

[22] Filed: Sep. 16, 1994

[51] Int. Cl.[6] .................................................. G06F 17/40
[52] U.S. Cl. .................................... 364/496; 364/497
[58] Field of Search ................................ 364/496, 497, 364/498, 499, 500, 579, 138; 395/250, 200.01, 200.05, 200.09

[56] References Cited

U.S. PATENT DOCUMENTS

| | | | |
|---|---|---|---|
| 4,399,502 | 8/1983 | MacDonald et al. | 364/189 |
| 4,424,559 | 1/1984 | Lorincz et al. | 364/131 |
| 5,396,595 | 3/1995 | Standley | 395/250 |
| 5,428,470 | 6/1995 | Labriola, II | 364/497 X |
| 5,519,635 | 5/1996 | Miyake et al. | 364/497 |

*Primary Examiner*—Emanuel T. Voeltz
*Assistant Examiner*—M. Kemper
*Attorney, Agent, or Firm*—John E. Vanderburgh

[57] ABSTRACT

A modular analyzer system consists of a control device and one or more functional analyzer modules linked to the control device. The analyzer modules include FID, NDIR, chemiluminescence and paramagnetic analyzers. Each analyzer module includes a microprocessor having all menus necessary for the operation of the analyzer. Menus are coded and transmitted in real time by providing the control device with a dictionary of menu phrases which are coded and the codes maintained in a code index at each analyzer module and at the control device. Since menus are maintained at the analyzer module and not transmitted until called for, there is no need to store specific menus at the control device. New modules can be easily added to the system and any phrases not already included in the phrase dictionary are downloaded to a supplemental dictionary when the new module is added. Data is displayed in the form called for by the analyzer menu and data from several analyzer modules can be displayed simultaneously. Auxiliary modules such as, for example, a computer, recorder or other field device can be linked into the system without reprogramming the system.

9 Claims, 3 Drawing Sheets

MODULAR ANALYZER SYSTEM

FIELD OF THE INVENTION

The present invention relates to a modular analyzer system, and more particularly to a modular system to which new or modified modules can be incorporated without reprogramming the entire system.

BACKGROUND OF THE INVENTION

With the advent of reliable electronic linking between nodes, it has become increasingly advantageous in the process control field to link analyzer nodes into a single system which can be operated at central control station. In this manner analyzers can be located at remote or in hazardous locations and can output the analysis to the central control station.

There are several problems involved in a system where a is control module is linked in some fashion to computerized functional modules which provide the various analysis operations for the system. Each module requires an interface with the control module and each of the module interfaces require a set of control screens by which a user can control the function of the module. Each of the control screens contains user configurable elements which allow the user to adapt the system for the particular functional module being controlled. These systems, however, once installed, would be difficult to modify or to add new functional modules. For example, a modification of a functional module in such a system requires a change in the interface screens which essentially results in a complete re-programming of the module interface, including all functions, variables and the like. A similar situation arises when new modules are added to the system since the control module must also be reprogrammed as well as the other modules which are linked with or interface with the new or modified module. Re-programming of the system is time consuming, difficult and expensive and can require a substantial amount of time to debug the new program.

One approach to this problem comprises the creation of a complete logical description of the new or modified module which is downloaded into the control module when the modification or a new module is installed. The effort required to write such a logical description can often be as difficult and time consuming as writing the module control program itself. In addition, this approach requires a large amount of memory in the control device in order to accept such a description of the new or modified module Another approach to the problem is to modify the hardware so as to be very general or very specific in its function. Thus, a module that is general in its hardware configuration is flexible and can accept modifications relatively easy. However, general hardware operation adds substantially to the problems of programming the system. A very specific hardware operation although making programming relatively simple, limits the module function and flexibility and has been found not to be satisfactory for complex analyzer systems Accordingly the present invention is designed to provide a modular analyzer system to which modules can be readily added or modified with a minimum of programming effort being required. The invention provides an interface system which is highly flexible and which is adapted to readily receive new modules and/or modifications of existing modules.

SUMMARY OF THE INVENTION

The present invention relates to an improved modular process control and analyzer system which can be easily modified by the addition of new functional modules and/or the modification or upgrading of functional modules already in the system easily and with a minimum of programming expense. In accordance with the present invention dissimilar analyzer modules such as infrared, chemiluminescent and flame ionization modules can be combined into a single system with the outputs from these dissimilar modules directed to a single control module for display. Likewise from the single control module an operator can control the function of the remote modules.

More particularly, the system includes a control device comprising a platform including input/output module for each functional module in the system. In addition, the control device includes a control module having a display and front panel keyboard inter-linked with a controller board for readout and control of the system. The system includes at least one functional module which may be remotely located and linked to the command module.

The functional module is self-contained unit with microprocessor electronics and detector means for carrying out the particular analyzer function of the module. All the necessary menus to operate and control the module and to create the display screens for that module are loaded into the module microprocessor. The control device and functional modules may be linked by any means capable of two way transfer of data between the modules and the control device, such as, for example, hardwire, fiber optics or even wireless transmission.

Functional module menus are coded and the control device is provided with a dictionary of menu phrases which are coded. The codes are maintained in a code index at each analyzer module and at the control device. Since menus are maintained at the analyzer module and not transmitted until called for, there is no need to store specific menus at the control device. Network traffic is maintained at a minimum by transmitting a code representing a phrase, variable or function between a functional module and the command module which is indexed to the particular phrase, variable or function for the module without the necessity of transmitting the entire text. Special phrases and/or phrases added by modification or new modules after initial installation of the system, are automatically downloaded into the control device and maintained in a supplemental phrase dictionary when the system is initially booted up with the modified or new module on-line. The data generated by each of the functional modules is stored in the form of variables which are common for the particular network being utilized. The control device interrogates each functional module in the system and copies the variables into a database maintained at the control device. In this manner the data variables can be immediately displayed in screens which can be transmitted in real time from the functional module without any further need for accessing the data variables at the functional module itself.

In other embodiments of the invention, the control device can accept software for automatic calibration of the system utilizing solenoid valves which are activated at set time intervals to turn zero and span calibration gases on and off when activated and to also provide contact closure to indicate zero or span calibration error while in the calibration mode. Such calibration may be automatic or may be controlled by a user supplied digital input device. The control device may also be adapted for linking with a personal computer so that all of the functional modules and control functions can be interrogated, initiated or changed from the personal computer which may be remote from the control module itself. The control device can accommodate the use of highway addressable remote transducer protocol (HART) for providing digital communication capabilities for field devices, for example, hand-held communicators.

BRIEF DESCRIPTION OF THE DRAWINGS

The invention will be more readily understood from the following detailed description of a preferred embodiment taken in conjunction with the drawings in which.

DESCRIPTION OF THE PREFERRED EMBODIMENT

Figure 1:
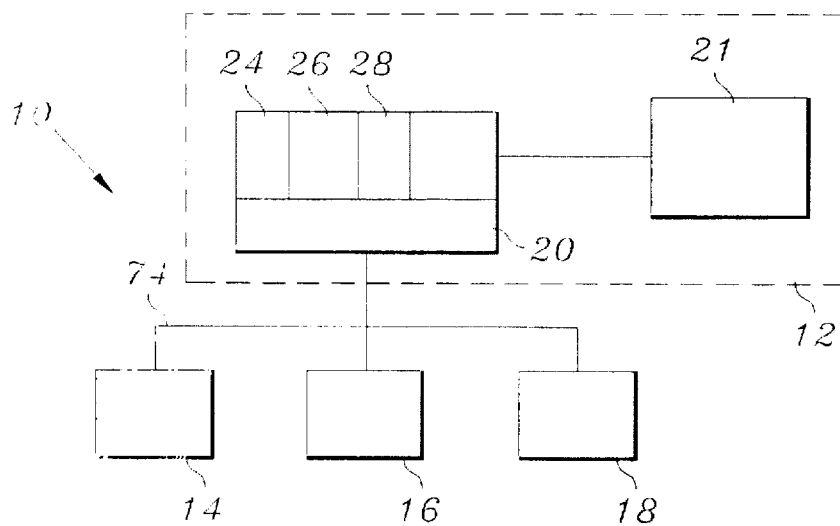
FIG. 1 is a schematic diagram illustrating the system with with the present invention including three functional modules.

Referring to FIG. 1, there is schematically illustrated a modular analyzer system in accordance with the invention, shown generally as 10. The system 10 comprises a command device 12 to which are linked functional modules 14, 16, and 18. These may be analyzer modules of the same or dissimilar types as will be described hereafter. The command device 12 consists of a platform 20 on which are mounted input/output (I/O) modules 24, 26, and 28 and a display module 21.

Figure 2:
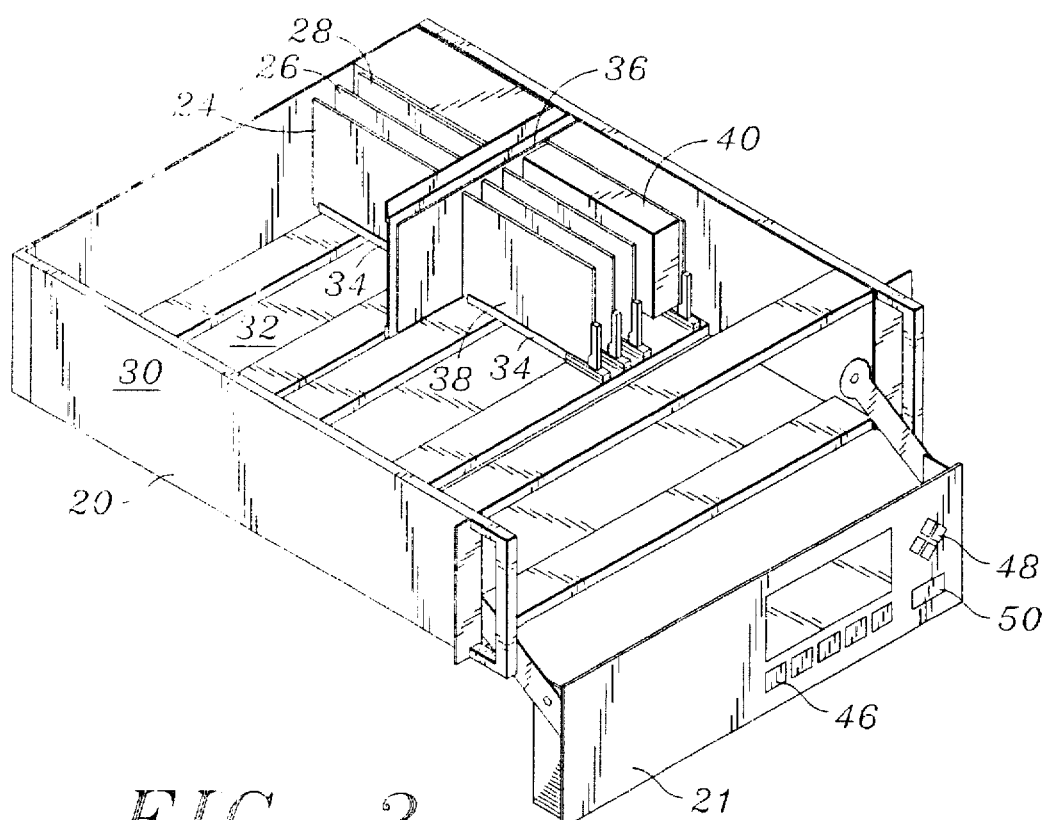
FIG. 2 is a perspective view of the platform showing the input/output modules controller boards and the like, which make up the control device.

As is shown in more detail in FIG. 2, a housing 30 encloses the platform 20 and the various controller boards and power supply The platform 20 is defined by a base 32 which carries mounting brackets 34 for mounting the I/O modules 24, 26 and 28. In the embodiment shown the platform 20 can mount up to five I/O modules which would limit the system to five modules. However, the platforms 20 can be linked together so that a system can consist of more than five modules as is described in connection with FIG. 6.

The I/O modules, 24, 26 and 28, are printed circuit boards with their own on-board microprocessor which provides embedded intelligence for bi-directional communications with the analyzer module which it serves and the platform 20. An I/O module is required for each functional module in the system. In the embodiment shown I/O modules 24, 26 and 28 correspond to and support the functional modules 14, 16 and 18 respectively. In addition an I/O module may be adapted for a wide variety of digital or analog system communication systems such as a distributed control system, data acquisition system or personal computer.

I/O modules 24, 26 and 28 are electrically connected to a distribution assembly 36 to which also are electrically connected controller boards 38. The controller boards 38 serve as a network manager and provide user interaction with the functional modules 14, 16, and 18 through one of the corresponding I/O modules 24, 26 or 28. Power to the platform 20 is supplied through a central power supply board 40 The display module 21 includes a display screen 44, soft keys 46 and arrow keys 48. The soft keys 46 are function dependent on the current menu selected and the arrow keys 48 are multi-functional, for example, scrolling, input data and moving around the screen 44. An enter key 50 executes menu items and inputs data. As shown in FIG. 2 sufficient space in the housing in provided for the insertion of at least one functional module which in combination with the platform and operator interface, permits the module to operate as a stand alone instrument. Power for the analyzer module is supplied by the central power supply board 40. In most case, however, the functional modules 14, 16 and 18 will be located remotely from the platform 20 and will be connected to their respective I/O modules through hardwire, fiber optics or the like. The display screen 44 is preferably a liquid crystal graphic display, i.e. 128×260 pixel liquid crystal graphic display. The display screen provides a local interface to measured prime values, systems set up information and diagnostics as well as important trending in graphic and tabular form which are displayed on screen menus from the functional module being interrogated.

Figure 3:
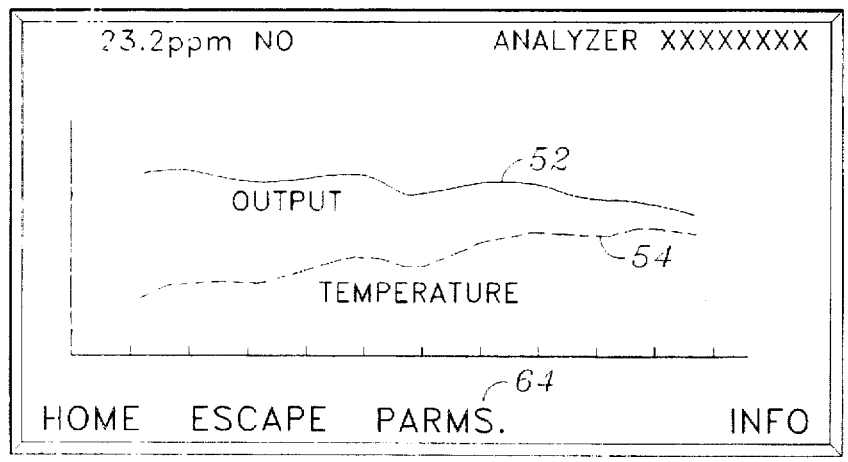
FIG. 3 is a representation of a display screen from a single functional analyzer module in graphic form.
Figure 4:
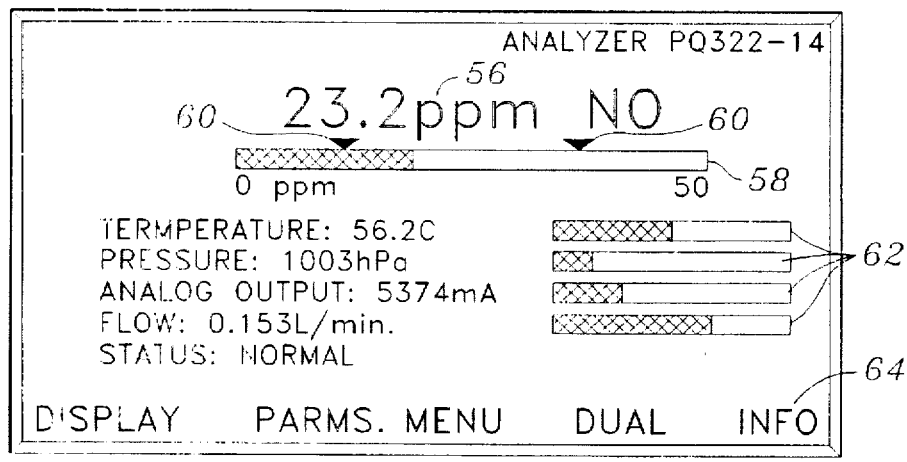
FIG. 4 is a representation of a display screen from a single functional analyzer module in textural form.
Figure 5:
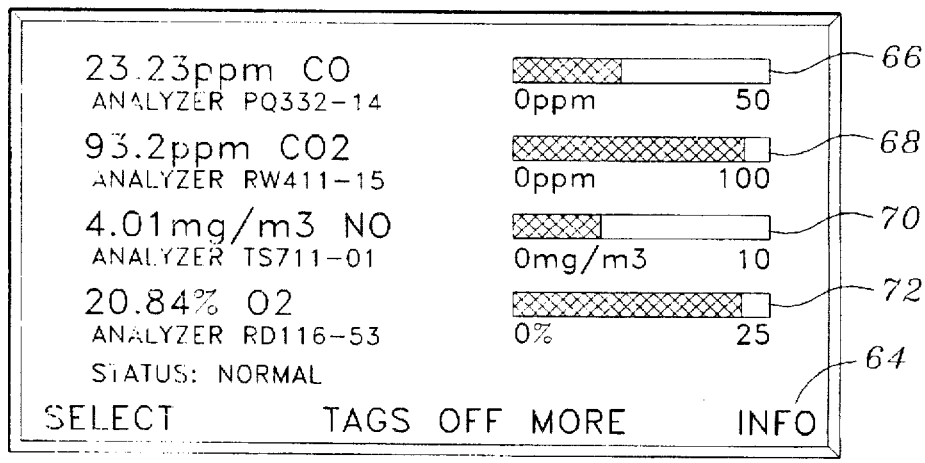
FIG. 5 is a representation of a display screen displaying data from several different functional analyzer modules.

Referring to FIG. 3 there is illustrated a typical run mode screen from a single analyzer module displaying output 52 and temperature 54 in graphic form. FIG. 4 is also a run mode screen viewed from a single analyzer module in tabular form showing the current composition of the component of interest 56, a single horizontal bar graph 58 showing component concentration and percent of full scale format, high and low scale set points 60 and bar graphs 62 reporting secondary values. The bottom line 64 of the display, displays the current functions for the soft keys 46. FIG. 5 is a display for a multi-component system displaying simultaneously a bar 66 for CO, a bar 68 for $CO_2$, a bar 70 for NO and a bar 72 for $O_2$.

The functional modules 14, 16 and 18 of the system illustrated in FIG. 1 are analyzer modules which may be adapted for the analysis of different gasses or may all be of the same type of analyzer but located in different areas of the process being monitored. The analyzer modules have been adapted from analyzers currently used for the analysis of various types of gasses. However, each analyzer module is a self-contained analyzer which includes a detector and necessary electronics for carrying out its analysis process Thus, at present there is provided a flame ionization detection module (FTD) for analysis of total hydrocarbons in a sample gas. A chemiluninescence detection module (CLD) is provided for the rapid and accurate measurement of the oxides of nitrogen ($NO/NO_2$) over a wide dynamic range from zero to ten ppm to zero to one thousand ppm. A non-dispersive infrared module (NDIR) for the measurement of heteroatomic gasses, for example, CO, $CO_2$, $SO_2$, NO, and $NH_3$. Continuous oxygen measurement is provided by a paramagnetic detection module (PMD). Each of the modules is adapted for networking in the system and intercommunicating as will be explained below.

In the preferred embodiment the functional modules 14, 16 and 18 are electronically connected to the command device 12 by 2 wire lines 74. A networking program is required to provide the interface between the functional modules 14, 16 and 18 and the control device 12 Any of presently available networking systems can be employed in accordance with the present invention. However, good results have been achieved utilizing a network program distributed under the trademark "LON" by Echelon Corporation. Communication between the I/O modules 24, 26 and 28 and the functional modules 14, 16, and 18 is digital.

Conventional modern stand-alone analyzers employ user interfaces consisting of a series of interlink "screens" for displaying functions, results and the like. The screens include words, symbols and numbers and change as the operator interacts with the equipment. Typically there is a screen for each particular action in which the analyzer is involved and a normal display which displays when the equipment is not otherwise being utilized. Each specific screen is referred to as a "menu" which contain links to other menus enabling the operator to access one from another. Conventionally the operator interfaces with each individual instrument and, accordingly, each instrument contains a full set of menus and a database for storing results. With a single functional module there is no problem in duplicating the analyzer menus at the command device. However, with a plurality of analyzer modules in the system, the memory requirements and time required to transfer data commands and the like becomes unduly long and renders such a system impractical. In addition, as mentioned above, adding or modifying an analyzer module requires re-programming the entire system at the command device which is time consuming, expensive, and which may produce errors in the system.

In accordance with the present invention, a hierarchical system of menus has been developed for use in the modular analytical system. This hierarchical system requires minimal network traffic to support the transfer of user interface information and provides menu screens capable of containing all of the required information. The delay between requesting information and display is minimal and the menu phrases are capable of translation into other languages without requiring software changes. Most importantly, the system is capable of supporting new or modified modules without requiring upgrades to already placed modules in the system and without reprogramming the entire network. As mentioned above, each of the functional modules 14, 16, and 18 have a microprocessor containing all of the menus and operating parameters necessary for operation of the analyzer. Variables, functions, commands and the like for each functional module are stored in menus as phrases by the functional module microprocessor. The menus contain a significant amount of text which would be difficult to transmit in real time. Accordingly, the phrases of each menu of each analyzer module in the system are compiled in a phrase dictionary by the control device. In addition, a phrase index containing a code for each phrase in the dictionary is created and stored at the control device and at each of the functional modules. Menus are transmitted from the functional modules 14, 16 and 18 to the I/O modules 24, 26 and 28 and ultimately to the display module 21 as bits of index code which then are used to pull up the complete phrase from the phrase dictionary from the command device 12 to construct the menu. To simplify the operation, the contents of the menus are standardized. Each menu is defined as a structure of lines of phrases of which the first line is a title, the following 12 lines contain either Lext or a variable description phrase with the relative variable, a menu description line with a link to another menu or a functional description line with the relevant function and a parameter. The last five lines are labels or attributes of the soft keys 46. The command device 12 is programmed to receive the various index codes, interpret the codes and pull out the appropriate phrases, variables or functions from the phrase directory for display. User selected functions are likewise transmitted to the appropriate one of the functional modules 14, 16 or 18 as index code which is received and interpreted at the module and translated into the function to be performed.

Data produced by the analyzer modules 14, 16 and 18 is stored in the form of common variables as determined by the protocol required by the network program. The control device 12 creates a database of variables by interrogating each of the modules 14, 16 or 18 on the network and downloading a complete description of the variables stored by that module. Thus the data form each of the modules 14, 16 and 18 is stored in the command device database and can be accessed and displayed in the menus sent by the modules. This also permits the use of menus such as the display illustrated in FIG. 5 in which the results of analysis from several of the modules are displayed simultaneously.

During network installation, the control device acts as a network manager and interrogates the functional modules 14, 16, and 18 to determine those modules that are connected in the system and to load additional phrase dictionaries and generate the database of variables. Modification of a module is readily accomplished by modifying the particular variable or function in the phrase dictionary as well as, of course, modifying the program in the microprocessor of the analyzer. This is accomplished without the necessity of upgrading or modifying the software for the entire system. To add a new module to the system it is necessary to insert the new I/O module in the platform to correspond with the new modules. Functions, variables and the like, which are not already in the system and which are specific to the new module are communicated to the command device 12 upon initialization of the new module in the system and stored in a supplemental phrase dictionary. The index code, accordingly, contains both a phrase number and a number indicating the dictionary in which the phrase is located. As can be seen, however, the new module is added without the necessity of re-programming the entire system. Links with established modules are easy to create and there is no need to reprogram an existing module to establish a link with a newly added module.

In accordance with the invention it is also possible to define logical separations between elements of a module. For example, some analyzer modules may measure two components in a sample stream simultaneously In such a case the variable outputs can be defined so that it appears in the menu system as though the module were two independent sub-modules. Thus, the menus will appear as though they are two analyzers connected to the control device 12 rather than one.

Figure 6:
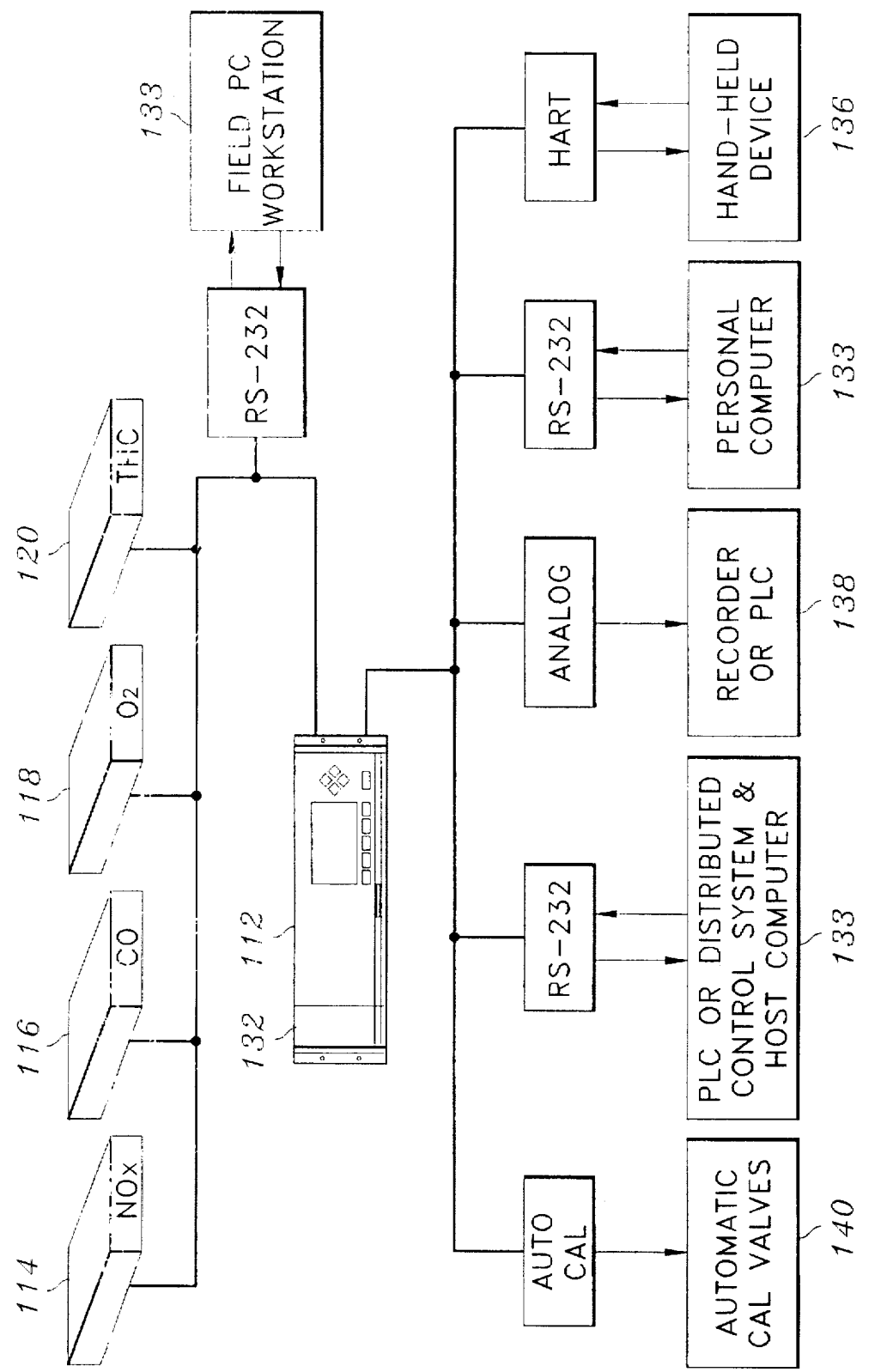
FIG. 6 is a schematic representation of another embodiment of the system with the present invention including four different analyzer modules, and adapted for connection with a hand held device, a personal computer, a recorder and automatic calibration valves.

As previously mentioned, auxiliary modules can be incorporated in the system to provide additional support and/or capabilities as required. These auxiliary are readily added in the same manner as the functional analyzer modules by mounting an I/O module for the auxiliary module. Referring to FIG. 6 there is shown a more complex system in accordance with the present invention. The system comprises four analyzer modules comprising a CLD module 114 for the analysis of $NO_x$; an NDIR analyzer module 116 for the analysis of CO; a PMD analyzer module 118 for the analysis of $O_2$, and a FID analyzer module 120 for the analysis of total hydrocarbons. An I/O module (not shown) corresponding to each of the analyzer modules is mounted on the platform 132 of the command device 112. In addition auxiliary modules are incorporated into the system by mounting corresponding I/O modules on the platform 132. For example an I/O module having an analog output through an RS232 connector is employed for linking in a personal computer module to the system. The personal computer may contain a phrase dictionary, phrase code index and necessary software to enable the system to be controlled through the computer as well as at the command device. An I/O module having HART output is mounted on the platform 132 for use with a hand-held field device 136. A recorder module 138 and an automatic calibration system 140 may also be linked into the system by the incorporation of suitable I/O modules on the platform 132. The module 140 allows software to be used for the automatic calibration of the system utilizing up to 4 solenoid valves at set time intervals. A similar module (not shown) can be incorporated in the system for user controlled calibration. An I/O module having calibration capabilities is required for each analyzer module to be calibrated.

From the foregoing there has been described a modular analyzer system in which multi-analyzer components are linked into a single, centrally controlled system. With the availability of various analog and digital I/O options, communication with auxiliary external modules can be made easily and without the need for additional signal conversion. Use of a phrase dictionary for menu phrases and a phrase index code system at the command device substantially reduces transmittal time between and makes practical communication between the analyzer modules and the command device display and allows central control over the function of remote analyzer modules. New modules are easily added to the system without the need of re-programming the entire system. Special phrases, unique to the new module, can be maintained in a supplemental phrase dictionary at the command device.

As will be understood by those skilled in the art, various arrangements that lie within the spirit and scope of the invention other than those described in detail in the specification will occur to those persons skilled in the art. It is therefore understood that the invention is to be limited only by the claims appended hereto.

Having described the invention we claim:

1. A modular analyzer system comprising:
    a. at least one functional module having a detector and microprocessing means containing a phrase menu for operating said module to determine the concentration of an unknown in a fluid sample and for displaying the results of said determination;
    b. an input/output module for each said functional module;
    c. a control device comprising a platform for mounting said I/O module, a control module having display means and means for entering operating commands into said system and means electronically connecting said input/output module and said control module;
    d. network means connecting said functional module and said control device; and
    e. a phrase dictionary in said control device containing the phrases in said phrase menu of said functional module, each phrase in said dictionary and the correlative phrase in said phrase menu of said functional module having a corresponding code, said codes being compiled in an index maintained at each said functional module and said control device, said corresponding codes being transmitted between said command module and said functional module;

whereby menus, data output and commands are transmitted between said functional modules and said control device as a series of codes substantially reducing memory requirements and transmission time.

2. The modular analyzer system of claim 1 wherein at least one said functional module is a non-dispersive infrared module.

3. The modular analyzer system of claim 1 wherein at least one said functional module is a paramagnetic detection module.

4. The modular analyzer system of claim 1 wherein at least one said functional module is a chemiluminescence detection module.

5. The modular analyzer system of claim 1 wherein at least one said functional module is a flame ionization detection module.

6. The modular system of claim 1 consisting of a non-dispersive infrared module, a paramagnetic detection module, a chemiluminescence detection module and a flame ionization detection module linked with said control device.

7. The modular system of claim 1 further including at least one of a computer modules a field device module, a recorder module and a calibration module.

8. The modular system of claim 1 wherein each said menu consists a structure of lines of phrases of which the first line is a title, the following twelve lines include text or a variable description phrase with the relative variable, the following line is a menu description line with a link to another menu or a functional description line with the relevant function and a parameter and the last five lines are labels or attributes for said means for entering operating commands.

9. The modular system of claim 1 wherein said menus for each said functional module are stored at said module and transmitted to said control device upon command from said control device and displayed by said display means of said control module.

* * * * *